United States Patent [19]
Shin

[11] Patent Number: 5,835,301
[45] Date of Patent: Nov. 10, 1998

[54] MULTI-TRACK HELICAL SCANNING SYSTEM

[75] Inventor: Ki-Hoon Shin, Seoul, Rep. of Korea

[73] Assignee: Daewoo Electronics Co., Ltd., Seoul, Rep. of Korea

[21] Appl. No.: 320,630

[22] Filed: Oct. 11, 1994

[30] Foreign Application Priority Data

Nov. 16, 1993 [KR] Rep. of Korea ................. 1993-24386

[51] Int. Cl.⁶ ................................................. G11B 5/027
[52] U.S. Cl. ..................... 360/84; 360/15; 360/130.23; 360/73.05; 360/75; 360/70
[58] Field of Search ................. 360/21, 22, 15, 360/10.3, 77.15, 33.1, 84, 85, 107, 130.24, 130.23, 73.05, 75, 70; 386/6, 46, 68, 81

[56] References Cited

U.S. PATENT DOCUMENTS

| | | | |
|---|---|---|---|
| 4,167,023 | 9/1979 | Bessette | 360/10.2 |
| 4,517,609 | 5/1985 | Yoshihika | 360/22 |
| 4,703,370 | 10/1987 | Inoue | 360/10.2 |
| 4,888,653 | 12/1989 | Cullum | 360/15 |
| 5,311,375 | 5/1994 | Ikushima | 360/33.1 |

FOREIGN PATENT DOCUMENTS

| | | |
|---|---|---|
| A-01049112 | 2/1989 | Japan . |
| A-01277304 | 11/1989 | Japan . |
| A-01296411 | 11/1989 | Japan . |
| A-02206013 | 8/1990 | Japan . |
| A-04195789 | 7/1992 | Japan . |
| A-05174304 | 7/1993 | Japan . |

OTHER PUBLICATIONS

"Design Method for a Tape Scanning System", Design and Estimation of a VTR Tape Scanning System, by N. Katsushi, pp. 11–14, published by Katsushita Electronics, Apr. 1990.

*Primary Examiner*—Aristotelis M. Psitos
*Assistant Examiner*—Alan Faber
*Attorney, Agent, or Firm*—Anderson Kill & Olick P.C.

[57] ABSTRACT

A head drum, as a first embodiment, for scanning a magnetic tape guided at an angle ($\theta_D$) to the head drum assembly includes 2N number of video heads being divided into a first and a second groups, each group having N video heads being positioned closely adjacent one another at a predetermined space and the N video heads in the first group being positioned symmetrically opposite the N video heads in the second group along the rotating direction of the drum assembly, N being a positive integer. A second embodiment of a head drum for scanning a magnetic tape guided at an angle ($\theta_D$) to the head drum assembly includes N pairs of video heads thereon, the N pairs of video heads being arranged in such a manner that each pair of video heads is angularly separated from one another by 360°/N. The angle ($\theta_D$) of the first and the second embodiments to the head drum assembly is defined as:

$$\theta_D = \tan^{-1}\left(\frac{W}{\frac{W}{\tan\theta_T} + NL}\right)$$

wherein $\theta_T$ is the track angle inclined with respect to a longitudinal direction of the magnetic tape, W is an effective tape width and L is the distance of the tape movement per track.

10 Claims, 4 Drawing Sheets

MULTI-TRACK HELICAL SCANNING SYSTEM

FIELD OF THE INVENTION

The present invention relates to a helical scanning system for use in a video cassette recorder ("VCR"); and, more particularly, to a multi-track scanning system of a magnetic tape loaded in the VCR.

DESCRIPTION OF THE PRIOR ART

In a VCR, a helical scanning system is normally employed to scan a magnetic tape through the use of a cylindrical rotatable drum assembly called "scanner" having a pair of video heads installed in a diametrically opposite relationship thereon for recording and/or reproducing a video signal.

Each video head is in contact with the tape for each revolution of the drum assembly to record or reproduce on a per field basis.

In such a helical scanning system, it is sometimes necessary to reproduce or record video signals at a high speed for the purpose of fast duplication. One of the important variables that control the duplication speed is the tape movement speed. The faster the tape movement speed is, the higher the duplication speed becomes. However, as the tape movement speed increases, the trajectory of the video heads tends to be misaligned with respect to their corresponding tracks on the tape due to the change in the relative speed between the tape and the video heads in contact with the tape. Therefore, there may occur cross talks caused by one of the video heads scanning a portion of its adjacent track. the cross talks in turn may produce a noise band in a reproduced picture.

Another important variable is the number of the heads mounted on the drum assembly. Certain VCR models include an extra pair of video heads. For example, one of the multi-head VCR system disclosed in U.S. Pat. No. 5,311,375 issued to Yoshiyuki Ikushima et al. includes a head arrangement on a drum assembly having a first and a second pairs of heads. The first pair of heads scans to form a first and a second tracks spaced apart by approximately one track width, and the second pair of heads scans to form a third and a fourth tracks spaced apart by approximately one track width and in an interlaced manner with the first and the second tracks. Such head arrangement may be useful in improving the quality of a reproduced picture in a special reproducing mode such as a still, fast forward, or cue mode.

Accordingly, there exists a need to develop a technology capable of equipping a VCR with the ability to duplicate prerecorded video signals in a high speed without creating a noise band.

SUMMARY OF THE INVENTION

It is, therefore, a primary object of the invention to provide a helical scanning apparatus capable of scanning a multiple number of video tracks to thereby achieve a high speed duplication.

In accordance with a preferred embodiment of the present invention, there is provided a helical scanning apparatus for use in a video cassette recorder for scanning a multiple number of tracks on a magnetic tape, which comprises: a tape transport means for moving the magnetic tape at a speed as N times high as a standard tape movement speed, wherein said N is a speed multiplying factor and positive integer (N=1, 2, 3, . . . ); and a rotatable head drum assembly for scanning the magnetic tape guided at an angle to the head drum assembly, the drum assembly having 2N number of video heads thereon which are installed along a circumferential outer surface of the head drum assembly, the video heads being divided into two groups, each group having N video heads, the video heads in each group being positioned closely adjacent one another at a predetermined space and disposed at different heights stepwise upwardly along the rotating direction of the head drum assembly, but aligned with the longitudinal direction of the tape.

In accordance with another embodiment of the present invention, there is provided a helical scanning apparatus for use in a video cassette recorder for scanning a multiple number of tracks on a magnetic tape, which comprises: a tape transport means for moving the magnetic tape at a speed said N times high as a standard tape movement speed, wherein said N is a speed factor and positive integer (N=1, 2, 3, . . . ); and a rotatable head drum assembly for scanning the magnetic tape guided at an angle to the head drum assembly, the drum assembly having N pairs of video heads thereon which are installed along a circumferential outer surface of the head drum assembly, said N pairs of video heads being arranged in such a manner that each pair of video heads is angularly separated from one another by 360°/N, each of the N pairs having a first and a second video heads which are disposed adjacent each other and the second video head in each pair is disposed at a predetermined height above the first video head in said pair along the rotating direction of the head drum assembly.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
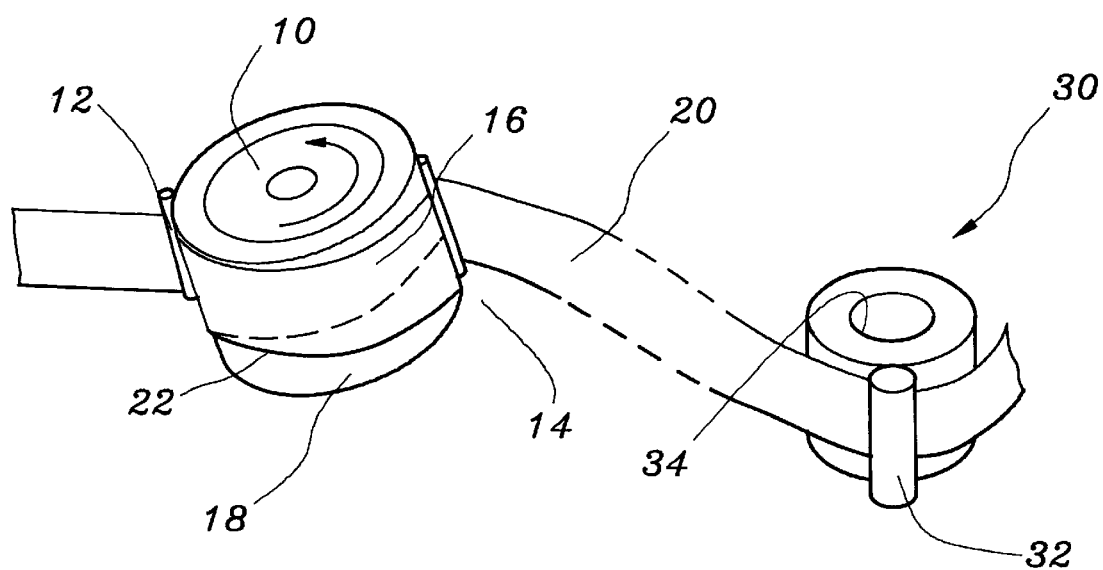
FIG. 1 shows a conventional helical scanning system.

Referring to FIG. 1, there is shown a basic arrangement for a conventional helical scanning system to help explain the invention, wherein a magnetic tape 20 is helically wound around a cylindrical head drum assembly 10.

To facilitate the tape 20 to enter and exit from the head drum assembly 10, there are provided a supply slant post 12 at the left side used as an entrance guide for the head drum assembly 10 and a take-up slant post 14 at the right side used as an exit guide for the head drum assembly 10. The supply slant post 12 makes the tape 20 travel downward and the take-up slant post 14 sets the tape toward the tape transporting mechanism 30 including a pinch roller 32 and a capstan 34.

The head drum assembly 10 is divided into an upper drum part 16 and a lower drum part 18. The upper drum part 16 rotates counterclockwise and carries two video heads mounted on the lower surface thereof. The video heads are precisely 180° apart, opposite each other on the same diameter of the drum assembly 10. They protrude slightly to press into the surface of the tape 20. The lower part 18 of the drum assembly 10 is stationary and has a guide band 22 machined into the surface thereof. The guide band 22 serves to guide the tape 20 at an angle of, e.g., 5.93539° to the drum assembly 10. The angle is called a "lead angle".

The video heads alternate in recording a sequence of video fields. Since a one-half turn takes approximately 1/60 second for one field, a full turn takes 1/30 second in the NTSC standard. The rotation speed, then, is 30 revolutions per second (rps), or 1800 revolutions per minute (rpm) for the head drum assembly 10.

Since the tape 20 is angled downward as it travels around the drum assembly 10, each video head crosses the width of the tape at a shallow angle. Each path starts near the lower edge of the tape and finishes near the upper edge.

The tape 20 is in contact with the head drum assembly 10 wrapping a little more than 180° and the tape 20 moves along the guide band at a standard speed, e. g., 33.35 mm/sec, in a playback mode or recording mode, through the use of the tape transport mechanism 30 including the pinch roller 32 and the capstan 34. Magnetic recording and/or reproducing is made on diagonal paths or tracks across the tape as the tape travels across the heads at the lead angle. As is well known in the art, the track is inclined at an angle of, e.g., 5.9694° with respect to the longitudinal direction of the magnetic tape 20. On each inclined track, there is a single vertical field containing 262.5 horizontal lines ("262.5 H") of video information, in case of the NTSC standard.

In accordance with the invention, the tape transport mechanism 30 is designed to move the magnetic tape 20 at a faster speed than the standard speed. That is, the tape transport mechanism 30 advances the magnetic tape at a speed N times as high as the standard speed on reproducing a prerecorded video signal or recording the reproduced video signal for the purpose of high speed duplication wherein N is a speed multiplying factor and positive integer (N=1, 2, 3, ... ). The head drum assembly 10 adapted to scan the magnetic tape 20 running at N times the standard speed will be described with reference to FIGS. 2 and 4 as follows.

Figure 2:
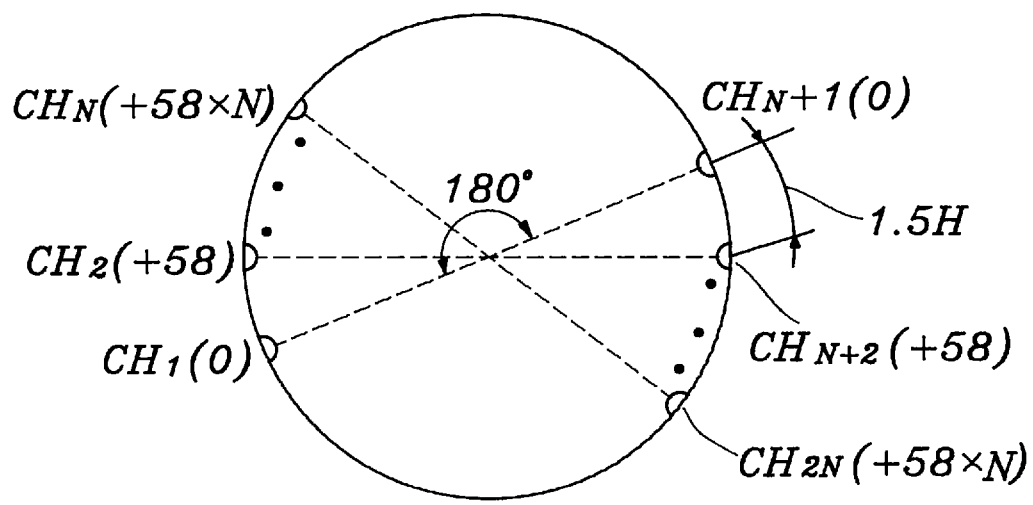
FIG. 2 presents a top plan view of the head arrangement on the head drum assembly shown in FIG. 1 in accordance with the invention.

FIG. 2 shows a plan view of the head drum assembly in accordance with the invention, which is capable of performing a multi-track scanning on the magnetic tape 20.

The drum assembly 10 includes a head arrangement having a number of video heads $CH_1$ to $CH_{2N}$ which are installed along a circumferential outer surface of the rotating upper drum part 16. The number N corresponds to the speed multiplying factor of the tape transport mechanism 30.

The video heads are divided into two groups. Each group has the N number of video heads, $CH_1$ to $CH_N$ and $CH_{N+1}$ to $Ch_{2N}$, which are positioned closely adjacent one another at a predetermined space. The predetermined space is 1.5 H which corresponds to the distance between two adjacent track edges being aligned with their corresponding video heads, as can be seen from FIG. 4, wherein H represent a horizontal video line. In addition, the video heads $CH_1$ to $CH_N$ in the first group are symmetrically opposite the video heads $CH_{N+1}$ to $CH_{2N}$ in the second group at an angle of 180°, respectively. The odd numbered video heads in each group have a first azimuth angle which is inclined in a first direction perpendicular to the head scanning direction while the even numbered video heads in each group have a second azimuth angle which is inclined in a second direction opposite the first direction, respectively. That is, the video heads take the first and the second azimuth angles in alternative fashion.

Figure 4:
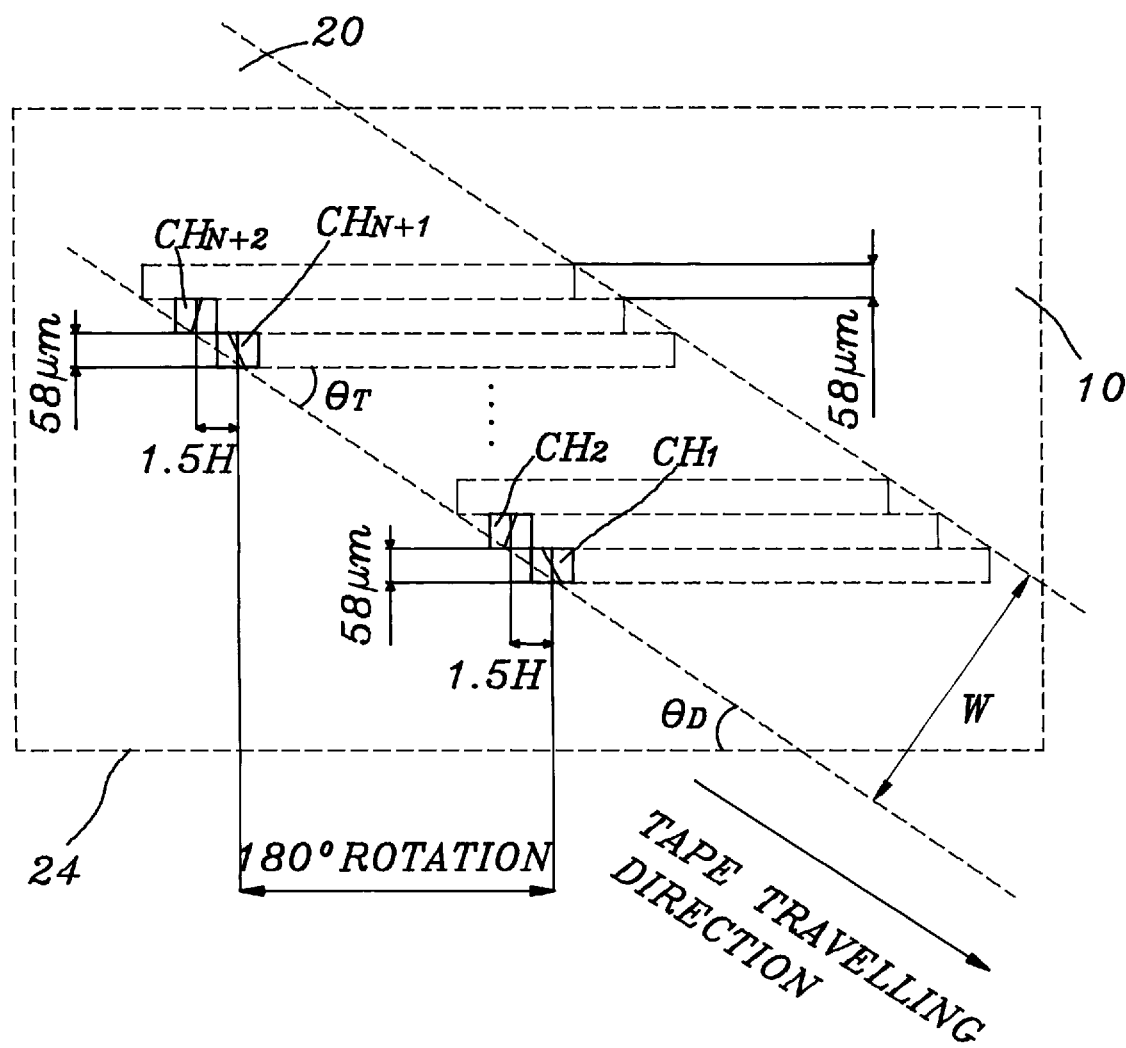
FIGS. 4 and 5 provide a diagrammatic view showing a track pattern on the magnetic tape traced by the head arrangement shown in FIGS. 2 and 3, respectively.

Further, as best shown in FIG. 4, the video heads $CH_1$ to $CH_N$ and $CH_{N+1}$ to $CH_{2N}$ in each group are arranged in such a way that when an imaginary straight line passing therethrough will have a slope which be less than an angle of 0°. That is, the video heads $CH_1$ to $CH_N$ and $CH_{+1}$ to $CH_{2N}$ in each group are disposed at different heights stepwise upwardly from the bottom edge 24 of the drum assembly 10, but aligned with the travelling or longitudinal direction of the tape 20 wrapping on the drum assembly 10, thereby ensuring that the video heads simultaneously scan the corresponding number of tracks on the tape 20. The height corresponds to an effective width of the track, i.e., 58 $\mu$m. The number in parentheses in FIG. 2 represents the stepwise height of the remaining video heads with respect to a leading video head $CH_1$ or $CH_{N+1}$ in the first or the second head group.

Referring to FIG. 4, there is illustrated the relationship between the video heads on the drum assembly 10 and the tape 20. As the tape 20 moves across the head drum assembly 10 at N, e.g., times the standard speed, all of the N video heads $CH_1$ to $CH_N$ in the first video head group lay down the lower edges of the corresponding N number of tracks and then scan the N tracks for a half-rotation of the head drum assembly 10. At a next time when the magnetic tape 20 advances to a position at which the second video head group is located, the N video heads $CH_{N+1}$ to $CH_{2N}$ in the second video head group simultaneously scan another N video tracks for a next half-rotation of the head drum assembly 10. Therefore, the N video heads in each group scan the respective corresponding N number of tracks on the magnetic tape 20 at a time during the duration of each pass of the head drum assembly 10, to thereby achieve the multi-track scanning of the magnetic tape 20.

If it is required to duplicate the video signal at a higher speed, two helical scanning systems may be employed, one of which is used for reproducing the video signal prerecorded on a magnetic tape and the other is used for recording the reproduced video signal on a blank tape.

Figure 3:
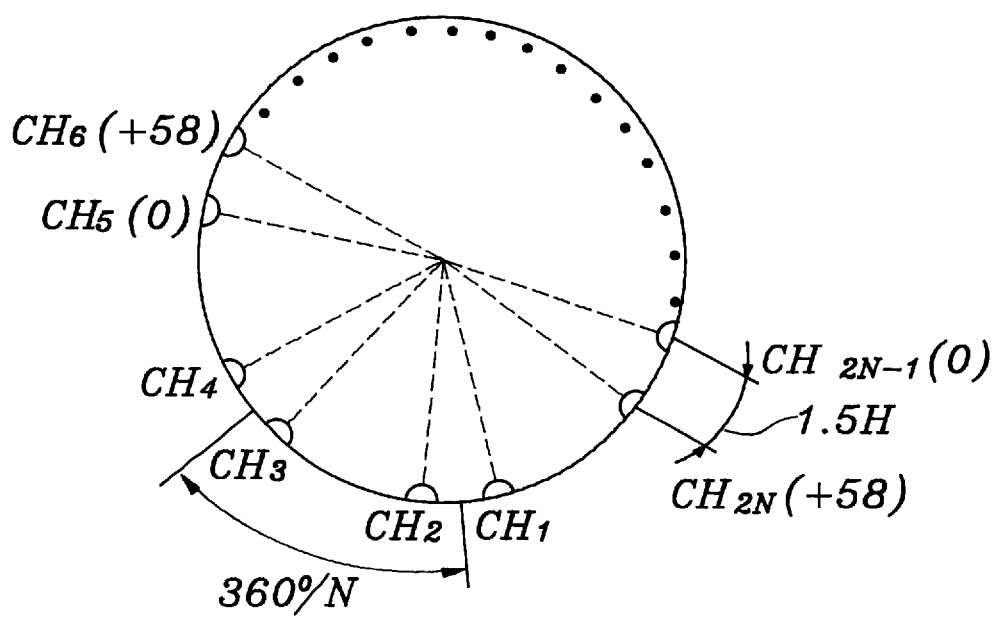
FIG. 3 represents a top plan view of another embodiment of the head arrangement on the head drum assembly in accordance with the invention.

FIG. 3 illustrates another preferred embodiment of the head arrangement of the head drum assembly in accordance with the invention. The head drum assembly 10 includes the head arrangement having N pairs of video heads, $CH_1$ to $CH_{2N}$ arranged in such a manner that each pair of video heads is angularly separated from each other by 360°/N.

Each of said N pairs contains a first and a second video heads which are disposed adjacent each other at a predetermined distance and have azimuth angles different from each other. The predetermined distance between the two video heads in each pair is also adjusted to 1.5 H as set forth above.

Figure 5:
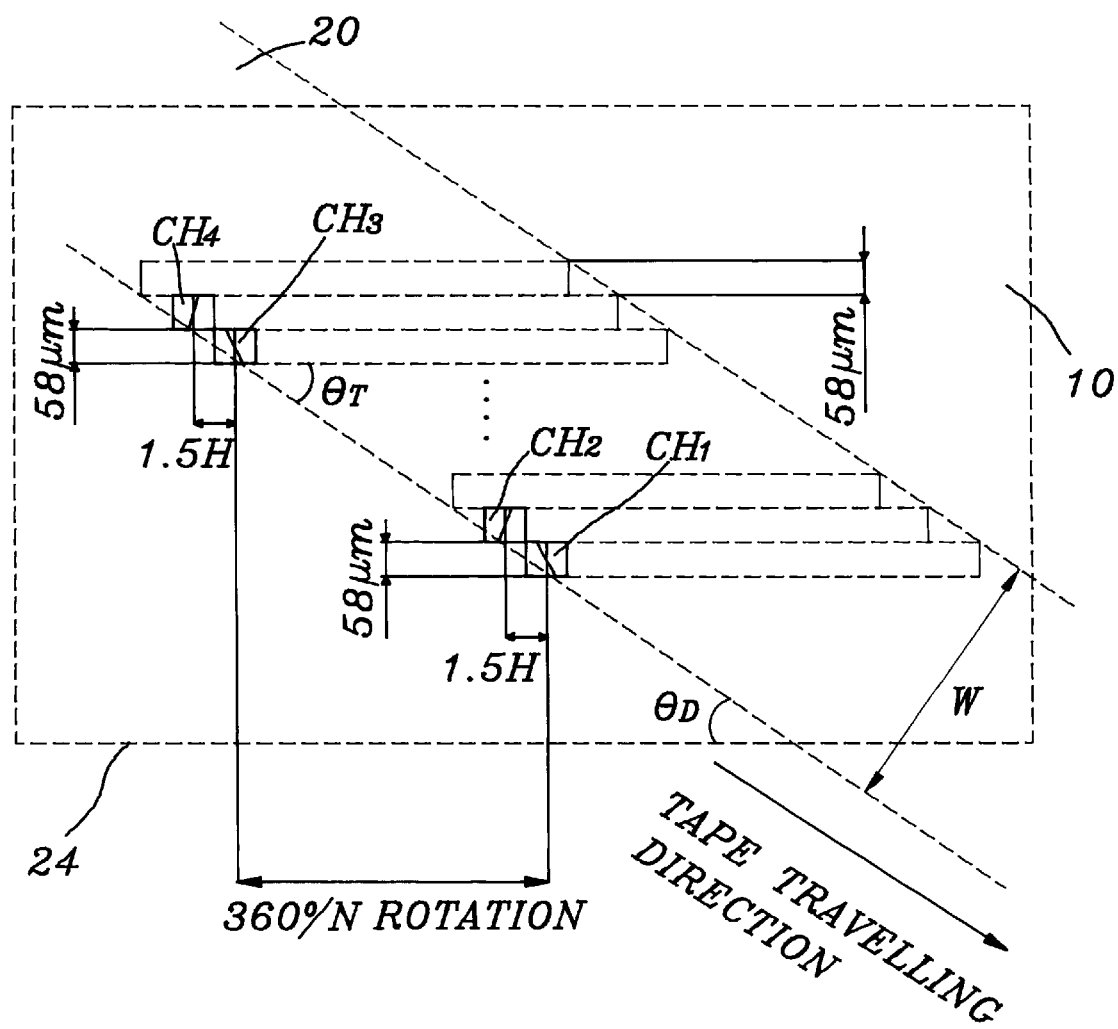

Further, as best shown in FIG. 5, the two video heads in each pair are disposed at a different height from the bottom edge 24 of the drum assembly 10, but aligned with the travelling or longitudinal direction of the tape 20 wrapping on the drum assembly 10. That is, the second video head $CH_2$, $CH_4$, $CH_6$ or $CH_{2N}$ in each pair is disposed at a different height above the first video head $CH_1$, $CH_3$, $CH_5$ or $CH_{2N-1}$ in each pair. The different height corresponds to the effective width of the track, e.g, 58 $\mu$m. The numbers in parentheses in FIG. 3 represent the height between the first and the second video heads.

Referring to FIG. 5, there is illustrates the relationship between the video heads on the drum assembly 10 for the second embodiment of the invention and the magnetic tape. As the tape 20 moves across the head drum assembly 10 at N, e.g. 2, times the standard speed, each video head pair sequentially lays down its corresponding pair of tracks to scan its corresponding tracks for each 360°/N rotation of the head drum assembly 10. Therefore, two tracks are traced by each pair of the video heads, to thereby reproduce N complete field video information during the period of each pass of the head drum assembly 10.

As the tape movement speed increases, the trajectory of the video heads tends to have a slope which will be greater than the track angle. Therefore, in order to allow the video heads to exactly trace the corresponding tracks on the magnetic tape 20, the lead angle "$\theta_D$" of the head drum assembly 10 should be changed as follows:

$$\theta_D = \tan^{-1}\left(\frac{W}{\frac{W}{\tan\theta_T} + NL}\right) \qquad \text{Eq. 1}$$

wherein $\theta_T$ is the track angle inclined with respect to the longitudinal direction of the magnetic tape, W is the effective tape width, N is the speed multiplying factor and L is the distance of the tape movement per track.

Further, since the lead angle is different from a conventional lead angle, the diameter "D" of the head drum assembly 10 should also be changed. The drum diameter can be derived as:

$$\sin\theta_D = \left(\frac{W}{\frac{\pi D}{2}}\right) \qquad \text{Eq. 2}$$

Accordingly, $$D = \left(\frac{W}{\frac{\pi \sin\theta_D}{2}}\right) \qquad \text{Eq. 3}$$

wherein D is the diameter of the drum assembly, N is the speed multiplying factor and $\theta_D$ is the lead angle of the drum assembly 10.

In this connection, it should be noted that the slant angle and the center coordinate for the slant posts 12 and 14 are also deformed to match with the configuration of the head drum assembly. There are well known methods in the art to derive the slant angle and the center coordinate. One of the methods, for instance, is disclosed in an article by Nakamura Katsushi, "Design Method for a Tape Scanning System", *Design and Estimation of a VTR Tape Scanning System*, pp 11–14, published by Matsushita Electronics Co., Ltd. in Japan (Apr. 30, 1990), which is incorporated herein by reference.

While the present invention has been shown and described with respect to the preferred embodiments, it will be apparent to those skilled in the art that many changes and modifications may be made without departing from the spirit and scope of the invention as defined in the appended claims.

What is claimed is:

1. A helical scanning apparatus for use in a video cassette recorder adapted for scanning a multiple number of tracks on a magnetic tape, which comprises:

a tape transport means for moving the magnetic tape at a speed N times as high as a standard tape movement speed, wherein said N is a speed multiplying factor and positive integer; and a rotatable head drum assembly for scanning the magnetic tape guided at an angle to the head drum assembly, the drum assembly having 2N number of video heads thereon which are installed along a circumferential outer surface of the held drum assembly, the video heads being divided into a first and a second groups, each of the groups having N video heads, the video heads in each group being positioned closely adjacent one another at a predetermined space and having azimuth angles different from each other in an alternating fashion, and the N video heads in the first group being positioned symmetrically opposite the N video heads in the second group along the rotating direction of the drum assembly, wherein the angle ($\theta_D$) to the drum assembly is defined as:

$$\theta_D = \tan^{-1}\left(\frac{W}{\frac{W}{\tan\theta_T} + NL}\right)$$

wherein $\theta_T$ is the track angle inclined with respect to a longitudinal direction of the magnetic tape, W is an effective tape width, N is the speed multiplying factor and L is the distance of tape movement per track.

2. The apparatus as recited in claim 1, wherein the diameter of the drum assembly is defined as:

$$D = \left(\frac{W}{\frac{\pi\sin\theta_D}{2}}\right)$$

wherein D is the diameter of the drum assembly.

3. The apparatus as recited in claim 1, wherein the video heads in each group are disposed at different heights stepwise upwardly from a bottom edge of the drum assembly.

4. The apparatus as recited in claim 3, wherein the height between the adjacent video heads corresponds to the effective width of a track on the magnetic tape.

5. The apparatus as recited in claim 1, wherein the predetermined space corresponds to a distance between two adjacent track edges on the magnetic tape being aligned with their corresponding video heads.

6. A helical scanning apparatus for use in a video cassette recorder adapted for scanning a multiple number of tracks on a magnetic tape, which comprises:

a tape transport means for moving the magnetic tape at a speed N times as high as a standard tape movement speed, wherein said N is a speed multiplying factor and positive integer; and a rotatable head drum assembly for scanning the magnetic tape guided at an angle to the head drum assembly, the drum assembly having N pairs of video heads thereon which are installed along a circumferential outer surface of the heard drum assembly, the N pairs of video heads being arranged in such a manner that each pair of video heads is angularly separated from one another by 360°/N, and each pair having a first and a second video heads which are disposed adjacent each other at a predetermined space and have azimuth angles different from each other, wherein the angle ($\theta_D$) to the head drum assembly is defined as:

$$\theta_D = \tan^{-1}\left(\frac{W}{\frac{W}{\tan\theta_T} + NL}\right)$$

wherein $\theta_T$ is the track angle inclined with respect to a longitudinal direction of the magnetic tape, W is an effective tape width, N is the speed multiplying factor and L is the distance of tape movement per track.

7. The apparatus as recited in claim 6, wherein the diameter of the drum assembly is defined as:

$$D = \left( \frac{W}{\frac{\pi \sin\theta_D}{2}} \right)$$

wherein D is the diameter of the drum assembly.

8. The apparatus as recited in claim 6, wherein the two video heads in each pair are disposed at a different height from a bottom edge of the drum assembly.

9. The apparatus as recited in claim 8, wherein the height between the two video heads corresponds to the effective width of a track on the magnetic tape.

10. The apparatus as recited in claim 6, wherein the predetermined space corresponds to a distance between two adjacent track edges being aligned with their corresponding video heads.

* * * * *

UNITED STATES PATENT AND TRADEMARK OFFICE
CERTIFICATE OF CORRECTION

PATENT NO. : 5,835,301
DATED : November 10, 1998
INVENTOR(S) : Ki-Hoon Shin

It is certified that error appears in the above-identified patent and that said Letters Patent is hereby corrected as shown below:

On the title page:

item [30] Foreign Application Priority Data

Nov. 16, 1993   [KR]   Rep. of Korea        93-24386

Signed and Sealed this

Ninth Day of March, 1999

*Attest:*

Q. TODD DICKINSON

*Attesting Officer*    Acting Commissioner of Patents and Trademarks